(12) United States Patent
Hironaka

(10) Patent No.: US 7,887,446 B2
(45) Date of Patent: Feb. 15, 2011

(54) HELICALLY-TOOTHED-BELT TRANSMISSION DEVICE

(75) Inventor: Akihiro Hironaka, Nara (JP)

(73) Assignee: The Gates Corporation, Denver, CO (US)

( * ) Notice: Subject to any disclaimer, the term of this patent is extended or adjusted under 35 U.S.C. 154(b) by 1096 days.

(21) Appl. No.: 10/551,835

(22) PCT Filed: Apr. 2, 2004

(86) PCT No.: PCT/JP2004/004873

§ 371 (c)(1),
(2), (4) Date: Aug. 7, 2006

(87) PCT Pub. No.: WO2004/090380

PCT Pub. Date: Oct. 21, 2004

(65) Prior Publication Data

US 2007/0066431 A1  Mar. 22, 2007

(30) Foreign Application Priority Data

Apr. 3, 2003  (JP) .............................. 2003-099971

(51) Int. Cl.
*F16G 1/28* (2006.01)

(52) U.S. Cl. .................. 474/205; 474/153; 474/204; 474/237; 474/261; 156/138; 156/140; 156/174

(58) Field of Classification Search ................. 474/205, 474/260, 263; 156/137
See application file for complete search history.

(56) References Cited

U.S. PATENT DOCUMENTS

| | | | | |
|---|---|---|---|---|
| 4,403,979 A | * | 9/1983 | Wujick | 474/153 |
| 4,840,608 A | * | 6/1989 | Araki et al. | 474/205 |
| 5,209,705 A | * | 5/1993 | Gregg | 474/204 |
| 6,685,785 B1 | * | 2/2004 | Morris et al. | 156/137 |
| 2002/0119854 A1 | * | 8/2002 | Mohr et al. | 474/237 |

FOREIGN PATENT DOCUMENTS

| | | | |
|---|---|---|---|
| JP | 11013840 A | * | 1/1999 |
| JP | 2000-320626 A | | 11/2000 |
| JP | 2000320626 A | * | 11/2000 |

OTHER PUBLICATIONS

"Noise and Life of Helical Belt Drive". Ueda et al. Transaction of the ASME. vol. 121. Jun. 1999.*

* cited by examiner

*Primary Examiner*—Robert A Siconolfi
*Assistant Examiner*—San Aung
(74) *Attorney, Agent, or Firm*—Paul N. Dunlap, Esq.; Jeffrey A. Thurnau, Esq.; Thomas A. Dougherty, Esq.

(57) ABSTRACT

Noise and vibration of a helically-toothed-belt transmission device driven under heavy load or at a high-speed rotation, are reduced. A backlash "D" is selectively enlarged in a helically-toothed-belt transmission device that transmits drive force by meshing between a helically toothed belt and a helically toothed pulley. That is, a tooth helix angle "θ" is set in a range of $-0.2 \leq 1-W \cdot \theta/Pt \leq 0.75$, with "Pt" being a tooth pitch, "θ" a tooth helix angle, and W the width of the belt. The backlash "D" between the helically toothed belt and the helically toothed pulley is set to be 1.6%-3% of the tooth pitch "Pt".

2 Claims, 5 Drawing Sheets

US 7,887,446 B2

HELICALLY-TOOTHED-BELT TRANSMISSION DEVICE

REFERENCE TO RELATED APPLICATION

This United States national application claims priority from JP-2003-099971 filed 3 Apr. 2003.

TECHNICAL FIELD

The present invention relates to a helically-toothed-belt transmission device, and particularly to a helically-toothed pulley and a helically-toothed belt used in a belt-drive transmission device that is driven under a heavy load or at a high-speed rotation.

BACKGROUND ART

When using straight teeth with a belt-drive transmission device, there exist problems of generating a lot of noise and vibration. As a way to solve these problems, a belt-drive transmission device that applies helical teeth, for example, is known (KOKAI No. 4-330853 (refer to claims and FIG. 3B)). However, for a power transmission device, such as a reduction device that is driven under a heavy load or at a high-speed rotation (e.g. 1500 rpm to 4500 rpm), the noise and the vibration are not always effectively reduced when using helical teeth.

DISCLOSURE OF INVENTION

The present invention is aimed at reducing noise and vibration in a helically-toothed-belt transmission device that is driven under a heavy load or at a high-speed rotation.

A helically-toothed-belt transmission device of the present invention is a helically-toothed-belt transmission device that transmits driving force by meshing between a helically-toothed belt and a helically-toothed pulley. The device is characterized in that when denoting a tooth pitch as "Pt", a tooth helix angle as "θ", and a belt width of the helically-toothed belt as "W", the tooth helix angle "θ" is set in a range of $-0.2 \leq 1 - W \cdot \theta / Pt \leq 0.75$, and a backlash between the helically-toothed belt and the helically-toothed pulley is set to be 1.6%-3% of the tooth pitch "Pt".

A helically-toothed-belt transmission device of the present invention is a helically-toothed-belt transmission device that transmits driving force by meshing between a helically-toothed belt and a helically-toothed pulley. The device is characterized in that when denoting a tooth pitch as "Pt", a tooth helix angle as "θ", and a belt width of the helically-toothed belt as "W", the tooth helix angle "θ" is set in a range of $1 - W \cdot \theta / Pt \leq 0$, and compressibility of the helically-toothed belt is set to be 1.5%-5%.

BEST MODE FOR CARRYING OUT THE INVENTION

In the following, the embodiments of the belt-drive transmission device of the present invention, which use helical teeth, will be explained with reference to the drawings.

Figure 1:
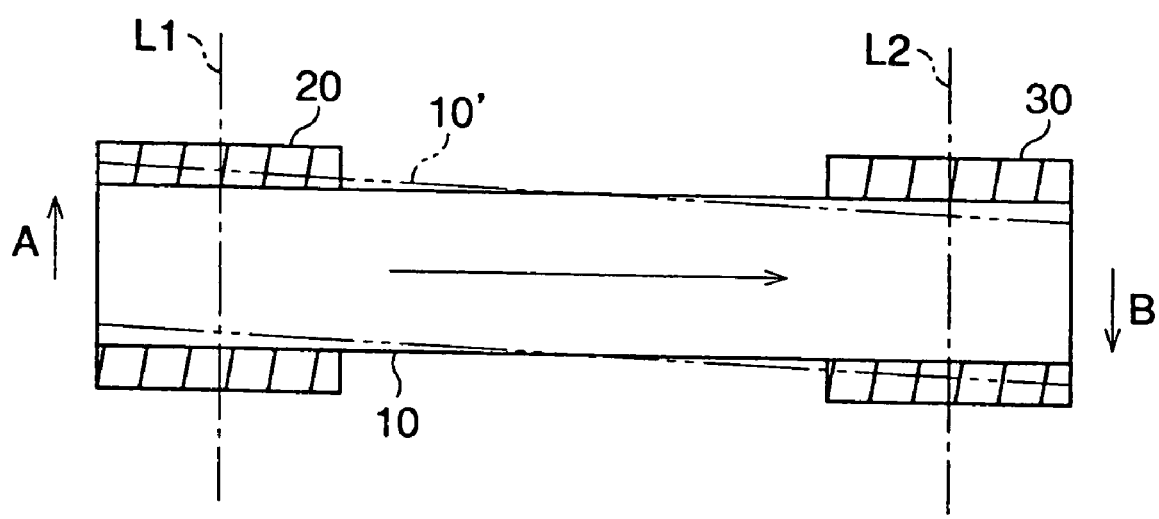
FIG. 1 schematically shows an arrangement of an endless helically-toothed belt installed on a helically-toothed pulley, which is viewed from a back side of the belt.
Figure 2:
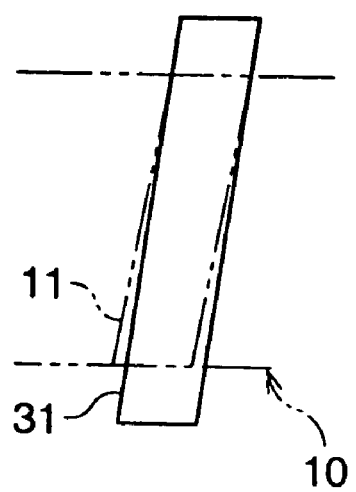
FIG. 2 is a schematic enlarged view showing the relations between the teeth traces of the helically-toothed pulley and the teeth traces of the helically-toothed belt engaged thereto, after the belt-drive transmission device operation is started or after the thrust has occurred.

With reference to FIG. 1 and FIG. 2, behavior of the belt and generation of noise and vibration in the belt-drive transmission device using a belt with helical teeth, will be explained.

FIG. 1 schematically shows an arrangement of an endless helically-toothed belt installed on a helically-toothed pulley, which is viewed from a back side of the belt. As shown in the figure, the helically-toothed belt 10 is entrained around a pair of helically-toothed pulleys 20 and 30 which are rotatable about respective axes "L1" and "L2". For example, the helically-toothed pulley 30 is a drive pulley and the rotational power of the helically-toothed pulley 30 is transmitted to the driven pulley 20 via the helically-toothed belt 10. In FIG. 1, the helically-toothed belt 10 described by a solid line indicates an arrangement of the helically-toothed belt immediately after the belt installation. On the other hand, a phantom line indicated by a reference number 10' represents a position of the helically-toothed belt 10 after the belt-drive transmission device is driven.

Immediately after the helically-toothed belt 10 is installed on the helically-toothed pulleys 20 and 30 (before the belt-drive transmission device is driven), teeth traces of the helically-toothed belt 10 coincide with teeth traces of the helically-toothed pulleys 20 and 30, so that the longitudinal direction of the helically-toothed belt 10 is made substantially perpendicular to the rotational axes "L1" and "L2" of the helically-toothed pulleys 20 and 30. However, when the helically-toothed pulley 30 or the drive pulley is driven and the load bears upon the helically-toothed belt 10, the helically-toothed belt 10 skids along the teeth traces of the pulleys, thus a thrust occurs. Namely, when the belt-drive transmission device is driven, the helically-toothed belt 10 skids on the helically-toothed pulley 20 in the "A" direction along the rotational axis "L1", and skids on the helically-toothed pulley 30 in the "B" direction, which is opposite to the "A" direction, along the rotational axis "L2", as shown in FIG. 1. Thereby, the helically-toothed belt 10, represented by the solid line, is moved to the position 10' which is represented by the phantom line. This type of thrust is prominent when the belt-drive transmission device is operated under a heavy load or at a high-speed rotation.

FIG. 2 is a schematic enlarged view showing the relations between the teeth traces of the helically-toothed pulley 30 and the teeth traces of the helically-toothed belt 10 engaged thereto, after the belt-drive transmission device operation is started or after thrust has occurred. As shown in the figure, a tooth trace 11 of the helically-toothed belt 10 is inclined against a tooth trace 31 of the helically-toothed pulley 30 to the amount of angles where the belt has slanted by the skid, so that the tooth trace 11 slips out of the tooth trace 31. When a gap is induced between the tooth trace of the helically-toothed belt 10 and the tooth trace of the helically-toothed pulley 30, inadequate contact is generated between the pulley and the belt. For example a shoulder (a part connecting a working flank and a tooth tip cylinder) of the pulley contacts a mating flank of the belt, or the like. Such inadequate engagement generates noise and vibration. Note that, as can be seen from FIG. 1, the same phenomena are induced on the helically-toothed pulley 20.

Figure 3:
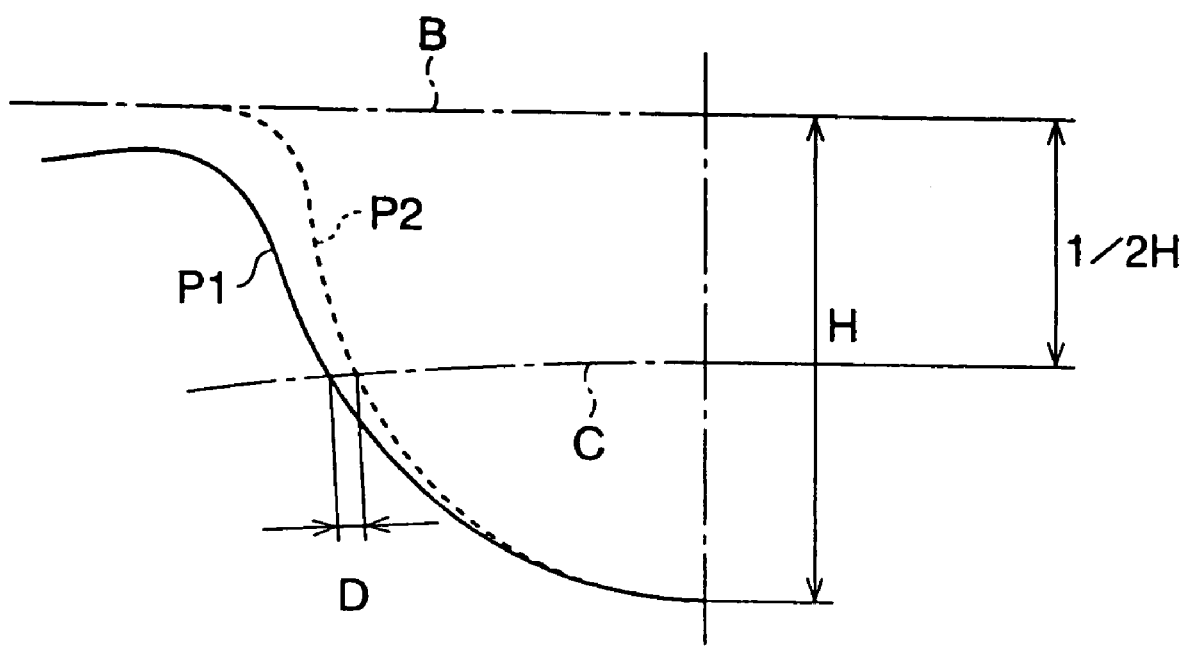
FIG. 3 is a drawing that illustrates the definition of a backlash between a belt tooth and a pulley tooth, and teeth profiles of the belt and the pulley are shown.

In order to solve such problems, backlash between the belt and the pulley is selectively enlarged in a first embodiment of the present invention, so as to prevent inadequate contact between the pulley teeth and the belt teeth and reduce noise and vibration. Referring to FIG. 3, the definition of backlash in the present embodiment will be explained.

In FIG. 3, (a half) tooth profiles of the belt and pulley are shown. A solid curve "P1" describes the tooth profile of the pulley and a broken curve "P2" describes the tooth profile of the belt. A straight line "B", a dash-dotted line, is the base line on a bottom land of the belt, so that a tooth height "H" is defined by the height from the base line B to the tip of the belt tooth. Further, is an arc "C", which is also indicated by a dash-dotted line, is an arc that passes through a point that is distant from the base line "B" by a half of the distance of the tooth height "H" (½H), and its center coincides with the center of the pulley. Namely, the diameter of the arc "C" is equivalent to a value where the tooth heights "H" are subtracted from the outside diameter of the pulley. The backlash between the belt and the pulley is defined by the distance "D" between the pulley tooth and the belt tooth at a position along the arc "C" (the distance between the intersection of the curve "P1" and the arc "C", and the intersection of the curve "P2" and the arc "C").

Figure 4:
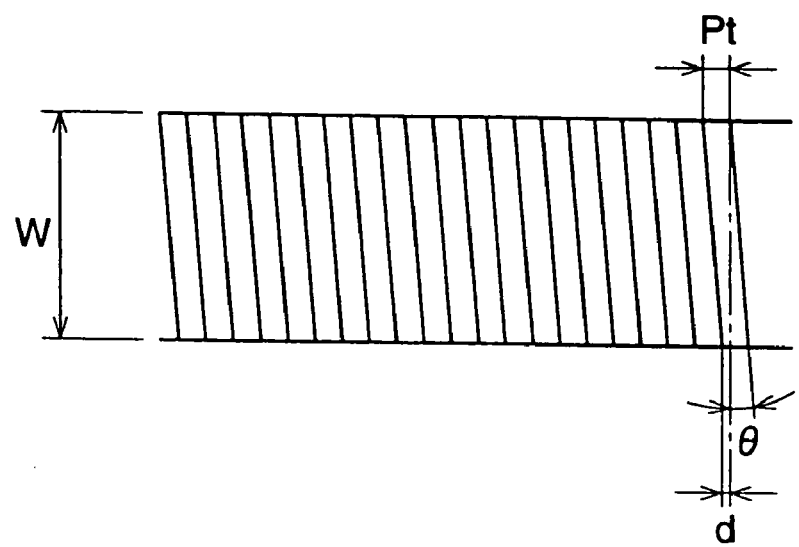
FIG. 4 is a part of a schematic development of a helically-toothed belt, which is applied to the first embodiment.

Next, referring to FIG. 4, an angle of the helical tooth applied to the endless belt of the first embodiment will be explained. FIG. 4 is a part of a schematic development of the helically-toothed belt 10, which is applied to the first embodiment. The teeth traces of the helically-toothed belt 10 are represented by the slanted solid lines which lie in the lateral direction of the belt. Here, the pitch of the belt teeth is denoted by "Pt" and the width is denoted by "W". Further, when denoting an angle (tooth helix angle) between the line in the lateral direction of the belt (or the line perpendicular to the belt longitudinal direction) and the tooth trace as "θ", a space "d" between the end of the first tooth engagement and the beginning of the neighboring second tooth engagement are represented by d=Pt−W·θ, using the pitch "Pt", the belt width "W", and the tooth helix angle "θ". In the first embodiment, the tooth helix angle "θ" is set so as to satisfy −0.2≦d/Pt=1−W·θ/Pt≦0.75.

In a conventional helically-toothed-belt transmission device, although the backlash "D" is set to about 1.5% with respect to the tooth pitch "Pt", the backlash "D" of the helically-toothed-belt transmission device of the first embodiment, is set in a range of 1.6% to 3% (D/Pt×100) of the tooth pitch "Pt".

Namely, in the helically-toothed-belt transmission device of the first embodiment, an inadequate contact between the teeth of the pulley and the belt is prevented, even when thrust is induced on the belt when a heavy load is placed upon the belt during operation, by setting the backlash "D" widely (wide backlash), such as at 1.6% to 3% of the tooth pitch "Pt".

Further, this is particularly effective for the tooth helix angles "θ" that satisfy −0.2≦d/Pt≦0.75. Namely, over a wide range of tooth helix angles "θ" (even for a small angle which is not very effective for a compressible tooth profile), the noise and the vibration can be reduced. As described above, according to the first embodiment, noise and vibration are effectively reduced for the helically-toothed-belt transmission device which is driven under a heavy load or at a high-speed rotation.

Figure 5:
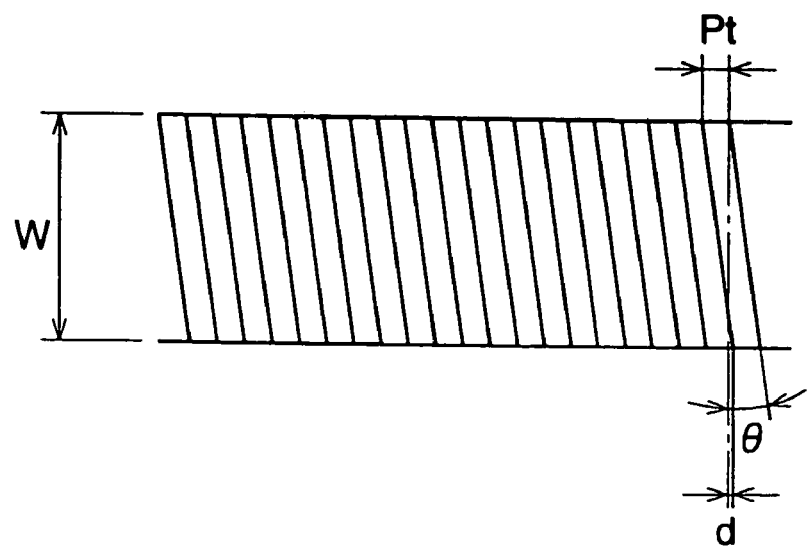
FIG. 5 is a part of a schematic development of a helically-toothed belt, which is applied to the second embodiment.

Next, with reference to FIG. 5 and FIG. 6, a belt-drive transmission device of a second embodiment of the present invention will be explained. FIG. 5 is part of a schematic development of the helically-toothed belt 10, which is applied to the second embodiment. The teeth traces of the helically-toothed belt 10 are represented by the slanted solid lines which lie in the lateral direction of the belt. Further, FIG. 6 shows a form of a compressible tooth profile applied in the second embodiment.

In the belt-drive transmission belt of the second embodiment, the tooth helix angle "θ" is set in a range of d/Pt=1−W·tan θ/Pt≦0. Namely, as shown in FIG. 5, a value of "d" is "0" or negative, so that the engagement of the neighboring second tooth starts before the end of the first tooth engagement (or simultaneously with the end of the engagement).

Figure 6:
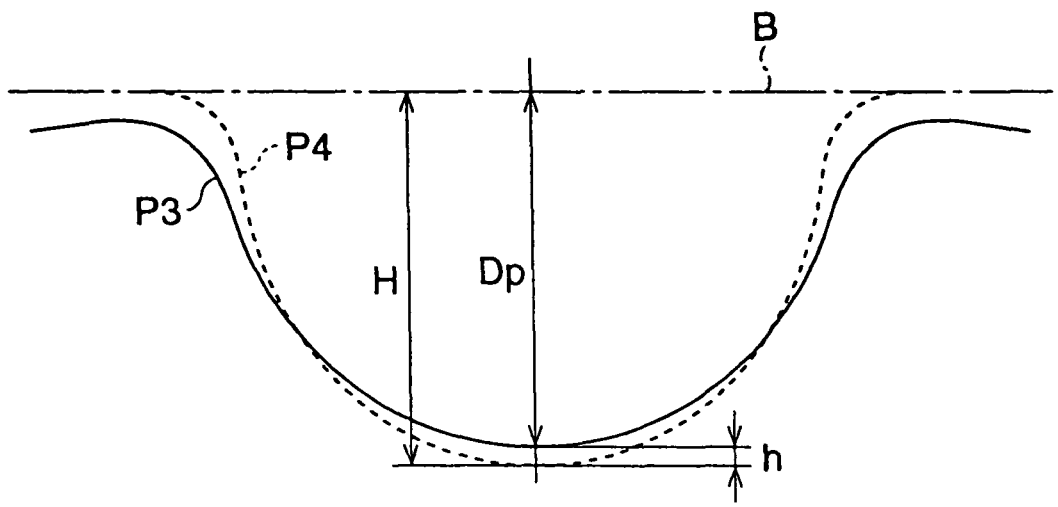
FIG. 6 shows a form of a compressible tooth profile applied in the second embodiment.

In FIG. 6, a curve "P3" indicated by a solid line represents the tooth profile of the helically-toothed pulleys 20 and 30 of the second embodiment, and a curve "P4" indicated by a broken line represents the tooth profile of the helically-toothed belt 10 of the second embodiment. Further, a dash-dotted line "B" represents the base line of the belt when the belt is installed. A groove depth "Dp", a depth from the base line "B" to the tooth root cylinder of the pulley, is smaller than the tooth height "H" of the belt by "h". Therefore, when the helically-toothed belt 10 is entrained about the helically-toothed pulleys 20 and 30, and tension is given, the belt teeth are pressed against the tooth root cylinder of the pulley and compressed. Thereby, positioning accuracy of each of the belt teeth to the pulley grooves is improved, so that a cumulative error between the belt teeth and the pulley teeth is reduced, and the inadequate contact between the belt teeth and the pulley teeth is prevented. Note that, in the second embodiment, the compressibility (h/H×100) of the helically-toothed belt is set within 1.5% to 5%.

As described above, according to the second embodiment, noise and vibration are effectively reduced from the helically-toothed-belt transmission device where the tooth helix angle "θ" is within the range of d/Pt=1−W·θ/Pt≦0, and where the device is driven under a heavy load or at a high-speed rotation, by preventing the inadequate contact between the belt teeth and the pulley teeth. Note that, the helically-toothed-belt transmission device of the second embodiment is particularly effective around a span resonance frequency.

EXAMPLES

In the following, the effect of the first embodiment and the second embodiment of the present invention will be explained with reference to the inventive examples and the comparative examples.

For all of the inventive examples 1-5 and the comparative examples 1-4, helically-toothed belts having a tooth pitch of 3 mm and a belt width 25 mm, were applied. Further, the tooth helix angles of the comparative examples 1, 2, and the inventive example 1, were 2°, and the tooth helix angles of the comparative examples 3, 4, and the inventive example 2, were 5°. Further, the tooth helix angles of the comparative example 5 and the inventive examples 3 and 4 were 8°. For all of the comparative examples 1, 3, and 5, a conventional tooth profile was applied, and the backlash was 1.5% of the tooth pitch, and the compressibility was 0%. However, the backlash of the inventive examples 1, 2, and 3 was 2.4% of the tooth pitch, and the compressibility was 0%. Further, for the comparative examples 2, 4, and the inventive example 4, the backlash was 0.8% of the tooth pitch and the compressibility was 4.7%.

Namely, the inventive examples 1, 2, and 3, corresponding to the first embodiment, have the wide backlash, and the inventive example 4, corresponding to the second embodiment, has a compressible tooth profile. Note that, the comparative examples 2 and 4, corresponding to the examples where a compressible tooth profile is used, have the tooth helix angle of the first embodiment.

Figure 7:
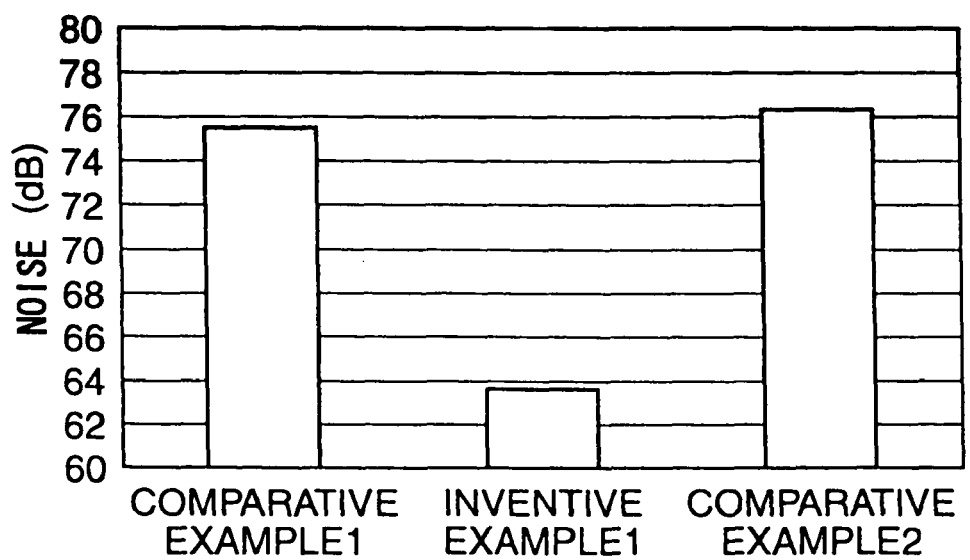
FIG. 7 is a graph which shows the result of noise tests for the comparative examples 1, 2 and the inventive example 1, when the tooth helix angles are 2°.

In FIG. 7, the result of noise tests for the comparative examples 1, 2 and the inventive example 1, when the tooth helix angles were 2°, is shown. As is apparent from FIG. 7, when the tooth helix angles were 20, the inventive example 1 to which the wide backlash was applied generated noise at a little less than 64 dB and showed a significantly high noise-reduction effect compared to the comparative example 1 with the conventional tooth profile and the comparative example 2 with the compressible tooth profile, which generated noise above 75 dB.

Figure 8:
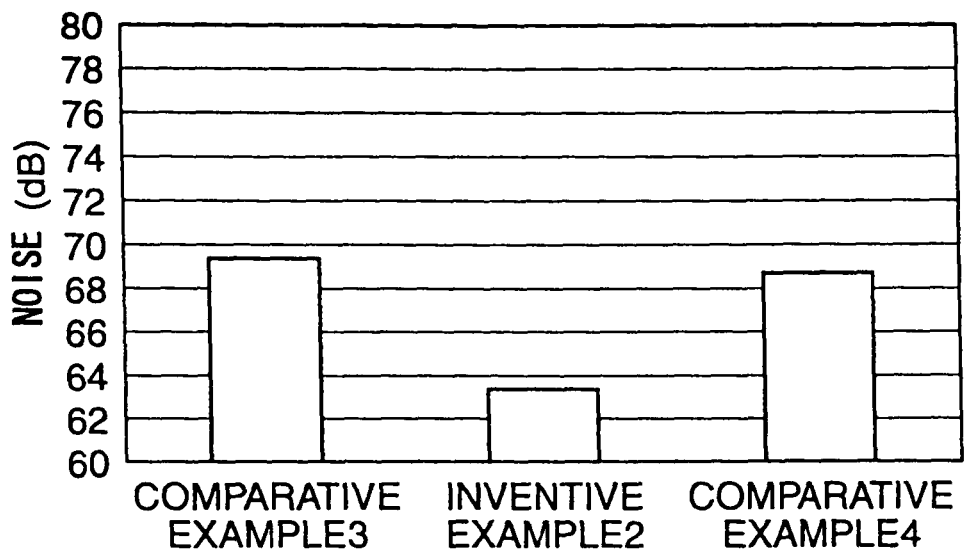
FIG. 8 is a graph which shows the result of noise tests for the comparative examples 3, 4 and the inventive example 2, when the tooth helix angles are 5°.

In FIG. 8, the result of noise tests for the comparative examples 3, 4 and the inventive example 2, when the tooth helix angles were 5°, is shown. Even when the tooth helix angles were 5°, the inventive example 2 to which the wide backlash was applied generated noise of about 63 dB and showed a significantly high noise-reduction effect compared to the comparative example 3 with the conventional tooth profile and the comparative example 3 with the compressible tooth profile, which generated noise above 68 dB.

Figure 9:
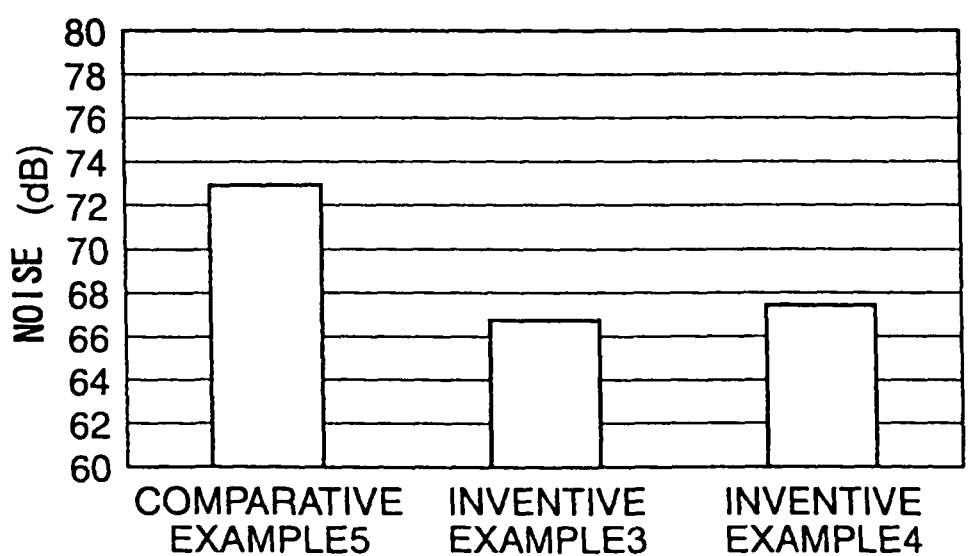
FIG. 9 is a graph which shows the result of noise tests for the comparative example 5 and the inventive examples 3 and 4, when the tooth helix angles are 8°.

In FIG. 9, the result of noise tests for the comparative example 5 and the inventive examples 3 and 4, when the tooth helix angles were 5°, is shown. Although the comparative example 5 having the conventional tooth profile generated noise above 72 dB, for the inventive examples 3 and 4, the noise was about 67 dB, so that a significant noise-reduction effect was obtained compared to the comparative example 5.

Note that, the wide backlash and the compressible tooth profile can also be combined (e.g. the backlash of 2.3% and the compressibility of 1.5%).

INDUSTRIAL APPLICABILITY

As described above, according to the present invention, noise and vibration can be reduced, in a helically-toothed-belt transmission device that is driven under a heavy load or at a high-speed rotation.

The invention claimed is:

1. A helically-toothed-belt transmission device for transmitting driving force by meshing between a helically-toothed belt and a helically-toothed pulley, the device being characterized in that:

when denoting a tooth pitch as "Pt", a tooth helix angle as "θ", and a belt width of said helically-toothed belt as "W", said tooth helix angle "θ" is set in a range of $-0.2 \leq 1 - W \cdot \tan \theta / Pt \leq 0.75$, and;

denoting a tooth height as "H", a backlash between said helically-toothed belt and said helically-toothed pulley is set to be from 1.6% to 3% of said tooth pitch "Pt" when measured at half the tooth height (½ H).

2. A helically-toothed-belt transmission device for transmitting driving force by meshing between a helically-toothed belt and a helically-toothed pulley, the device being characterized in that:

when denoting a tooth pitch as "Pt", a tooth helix angle as "θ", and a belt width of said helically-toothed belt as "W", said tooth helix angle "θ" is set in a range of $1 - W \cdot \tan \theta / Pt \leq 0$, and;

compressibility of said helically-toothed belt is set to be from 1.5% to 5%.

* * * * *

UNITED STATES PATENT AND TRADEMARK OFFICE
CERTIFICATE OF CORRECTION

| | | |
|---|---|---|
| PATENT NO. | : 7,887,446 B2 | Page 1 of 1 |
| APPLICATION NO. | : 10/551835 | |
| DATED | : February 15, 2011 | |
| INVENTOR(S) | : Akihiro Hironaka | |

It is certified that error appears in the above-identified patent and that said Letters Patent is hereby corrected as shown below:

Title Page, Item (57) Abstract at line 7, Col. 1, line 42 and line 52, Col. 3 line 52 and line 55, and Col. 4, line 46, "$W \cdot \theta$", each occurrence, should be changed to --$W \cdot \tan \theta$--.

Signed and Sealed this
Tenth Day of July, 2012

David J. Kappos
*Director of the United States Patent and Trademark Office*